United States Patent [19]

Wakatsuki et al.

[11] Patent Number: 5,023,438
[45] Date of Patent: Jun. 11, 1991

[54] PORTABLE DATA INPUT APPARATUS WITH DIFFERENT DISPLAY MODES

[75] Inventors: Yoshio Wakatsuki; Toshiharu Okuyama; Hajime Takeuchi; Giichiro Shimizu; Misao Shimizu, all of Tokyo, Japan

[73] Assignee: Nitto Kohki Co., Ltd., Tokyo, Japan

[21] Appl. No.: 440,764

[22] Filed: Nov. 24, 1989

[30] Foreign Application Priority Data

Nov. 26, 1988 [JP] Japan .................................. 63-299317
Nov. 26, 1988 [JP] Japan .................................. 63-299318

[51] Int. Cl.$^5$ .......................... G06K 7/10; G09G 1/06
[52] U.S. Cl. .................................... 235/472; 235/462; 340/711; 340/727
[58] Field of Search ............... 235/462, 472, 375, 383, 235/454; 340/707, 711, 727; 341/22, 23

[56] References Cited

U.S. PATENT DOCUMENTS

| | | | |
|---|---|---|---|
| 4,158,194 | 6/1979 | McWaters et al. | 340/711 X |
| 4,418,277 | 11/1983 | Tremmel et al. | 235/472 |
| 4,727,245 | 2/1988 | Dobbins et al. | 235/472 |
| 4,801,786 | 1/1989 | Stobbe | 235/472 X |

FOREIGN PATENT DOCUMENTS

| | | |
|---|---|---|
| 56-74765 | 6/1981 | Japan . |
| 58-86486 | 5/1983 | Japan . |
| 59-87541 | 5/1984 | Japan . |
| 2122787 | 1/1984 | United Kingdom . |

Primary Examiner—Stuart S. Levy
Assistant Examiner—Steven M. duBois
Attorney, Agent, or Firm—Nixon & Vanderhye

[57] ABSTRACT

A portable data input apparatus comprises an elongated casing. A pen-scanner type bar code reader reads a bar code provided according to the kind of a commodity, and outputs a corresponding code data unit. A keyboard is designed to input at least a numerical data unit representative of the amount of the commodity. A display device displays the code data unit and the numerical data unit. A display mode changing circuit is designed to invert the image of the data units displayed on the display device in the vertical direction and the horizontal direction, in response to a detection signal, which is output when the code data and numerical data are inversely displayed.

14 Claims, 10 Drawing Sheets

| COMMODITY CODE | | AMOUNT | COMMODITY CODE | AMOUNT | GOODS |
|---|---|---|---|---|---|
| CODE | NUMBER | | | | |

FIG. 3A ~16a

FIG. 3B — CODE READ BUFFER ~16b

FIG. 3C — DISPLAY BUFFER ~16c

FIG. 3D — TRANSMISSION BUFFER ~16d

FIG. 3E — AMOUNT DATA BUFFER ~16e

FIG. 3F — RECEIVING BUFFER ~16f

PORTABLE DATA INPUT APPARATUS WITH DIFFERENT DISPLAY MODES

BACKGROUND OF THE INVENTION

1. Field of the Invention

The present invention relates to a portable data input apparatus for reading bar codes attached to articles and the like by using a pen scanner type bar code reader and, more particularly, to a portable data input apparatus which allows an operator to see the erect image of displayed data in a state of use corresponding to the more dexterous hand of the operator.

2. Description of the Related Art

A portable data input apparatus is generally used for enhancing working efficiency, in checking the inventories of goods displayed in a shop, and in ordering new goods from a wholesale dealer.

This type of portable data input apparatus has a microcomputer therein. The casing of the portable data input apparatus is shaped so that one can carry it by one hand. The outer surface of the casing is provided with a keyboard for inputting the code data and amount data of goods, and a display for displaying the key-input data. A memory section constituted by a RAM, etc. for storing the key-input data is provided within the casing.

When ordering inventories with use of the portable data input apparatus, a right-handed person holds the casing in the left hand and key-inputs data by the right hand, while a left-handed person holds the casing in the right hand and key-inputs data by the left hand.

For simplifying the data input operation of the portable data input apparatus, there has been proposed a portable data input apparatus in which a pen-scanner type bar code reader is connected by a connection cable to the portable data input apparatus, and commodity codes are read by the bar code reader.

In the portable data input apparatus having the above structure, however, if the pen-scanner type bar code reader is connected to the portable data input apparatus, for example, with use of a connection cable, the bar code reader would prevent smooth carriage of the data input apparatus. Thus, the handling and maintenance of the bar code reader are troublesome.

SUMMARY OF THE INVENTION

An object of the present invention is to provide a portable data input apparatus wherein a bar code reader is integrated with the data input apparatus so as to enhance the working efficiency.

Another object of this invention is to provide a portable data input apparatus wherein an operator can easily read displayed data, even if he or she is left-handed.

In order to achieve the above objects, there is provided a portable data input apparatus comprising:

a pen scanner type bar code reader for reading a bar code provided according to the kind of a commodity and for generating a corresponding code data;

a keyboard for inputting at least numerical data representative of the amount of the commodity;

a display device for displaying the code data generated by the bar code reader and the numerical data input through the keyboard;

means for detecting that the code data and numerical data are inversely displayed, and for generating a detection signal; and display mode inverting means for vertically and horizontally inverting display states of the code data and numerical data displayed by the display device, in response to the detection signal generated by the detecting means.

BRIEF DESCRIPTION OF THE DRAWINGS

A more complete appreciation of the invention and many of the attendant advantages thereof will be more readily obtained through reference to the following detailed description and accompanying drawings, in which.

DETAILED DESCRIPTION OF THE PREFERRED EMBODIMENT

An embodiment of the present invention will now be described with reference to the accompanying drawings.

Figure 1A:
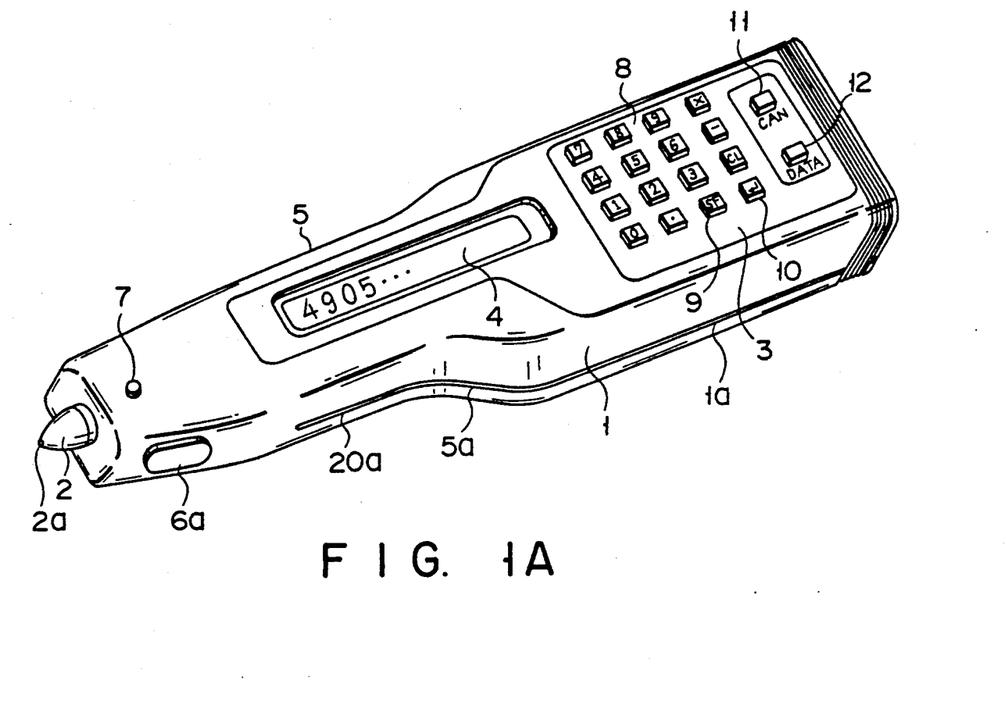
FIG. 1A is a perspective view of a portable data input apparatus according to an embodiment of the present invention.
Figure 1B:
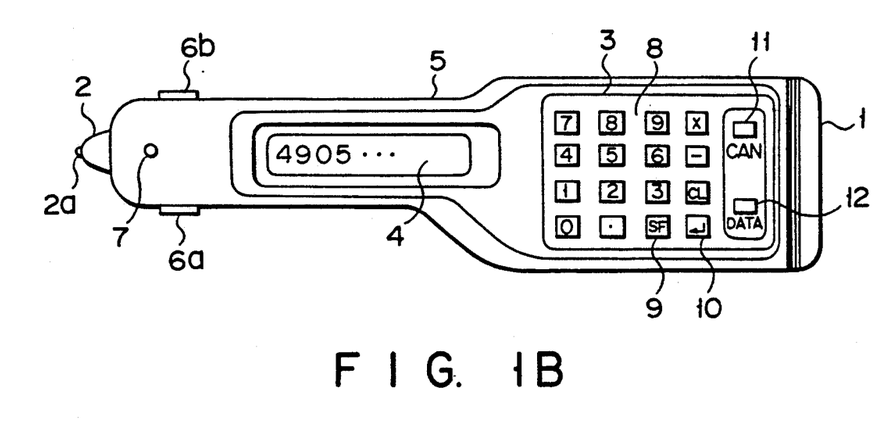
FIG. 1B is a top view of the apparatus shown in FIG. 1.

FIG. 1A is a perspective view of a portable data input apparatus according to an embodiment of the present invention, and FIG. 1B is a top view of the apparatus shown in FIG. 1A. This apparatus is designed to be suitable for an ordering work for ordering inventories of goods displayed in a shop.

In FIG. 1, reference numeral 1 denotes an elongated casing formed of, e.g., plastics. A head portion of the casing 1 is provided with a pen-scanner type bar code reader 2, and a photosensor 2a composed of a light-emitting element and a light-receiving element. A bottom portion of the casing 1 (i.e., opposite to bar code reader 2) is provided with a keyboard 3 for key-inputting various data units. Also, a rectangular display 4 having a liquid crystal display face for showing data units with dot-pattern characters is arranged at a longitudinally middle portion of casing 1. That portion of casing 1, which extends from the region of display 4 to the region of the bar code reader 2, serves as a handle 5 and has a smaller diameter than the other part of casing 1, for easy grasp by an operator.

A pair of display mode changing switches 6a and 6b are provided on both sides of a distal end portion of the smaller-diameter handle 5. A lamp 7 disposed in the vicinity of bar code reader 2 indicates and confirms that bar codes have been correctly read and that data has been transmitted to a data processing device.

The keyboard 3 has various function keys such as numeral keys 8 for inputting numerical data, a shift key 9, a scroll key 10 for shifting the position of data displayed on the display 4, a cancel key 11 for cancelling the data stored in the memory section, and a data transmission key 12 for transmitting the data stored in the memory section to the data processing device.

Figure 2:
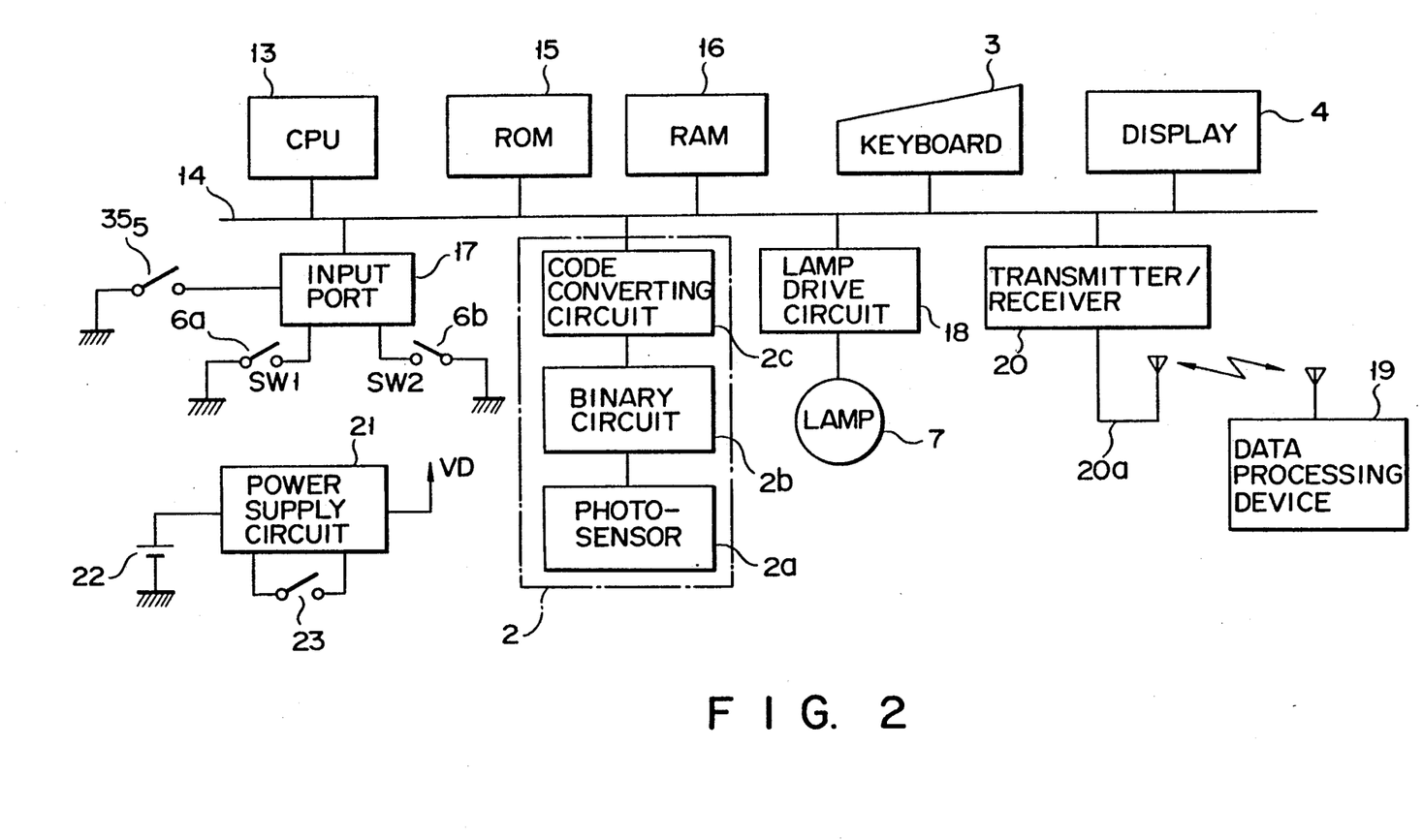
FIG. 2 is a block diagram illustrating a schematic structure of the data input apparatus of the invention.

FIG. 2 is a block diagram showing a schematic structure of the portable data input apparatus according to the present invention. In FIG. 2, reference numeral 13 denotes a CPU (central processing unit) for executing various arithmetic operations. The CPU 13 is connected through a bus line 14 to electronic structural elements, i.e., a ROM 15 for storing fixed data such as control programs and character generators, a RAM 16 for storing variable data such as key-input data, a keyboard 3, a display 4, an input port 17 for receiving signals from the display mode changing switches 6a and 6b, a bar code reader 2, a lamp drive circuit 18 for driving the lamp 7, and a transmitter/receiver 20 for wirelessly transmitting data to a transmitter/receiver built in the data processing device 19 and receiving response signals from the data processing device 19.

A DC drive voltage $V_D$ is supplied from a power supply circuit 21 to each electronic structural element. The power supply circuit 21 is supplied with power from a battery 22.

Image data of a bar code read by the photosensor 2a of pen-scanner type bar code reader 2 is normalized by a binary circuit 2b into a high (H) level signal or a low (L) level signal, and then is converted by a code converting circuit 2c to code data corresponding to a read bar code. When the read bar code is correctly converted to code data, the lamp 7 is turned on only for a predetermined time period, e.g., one second.

Figures 1C, 1D:
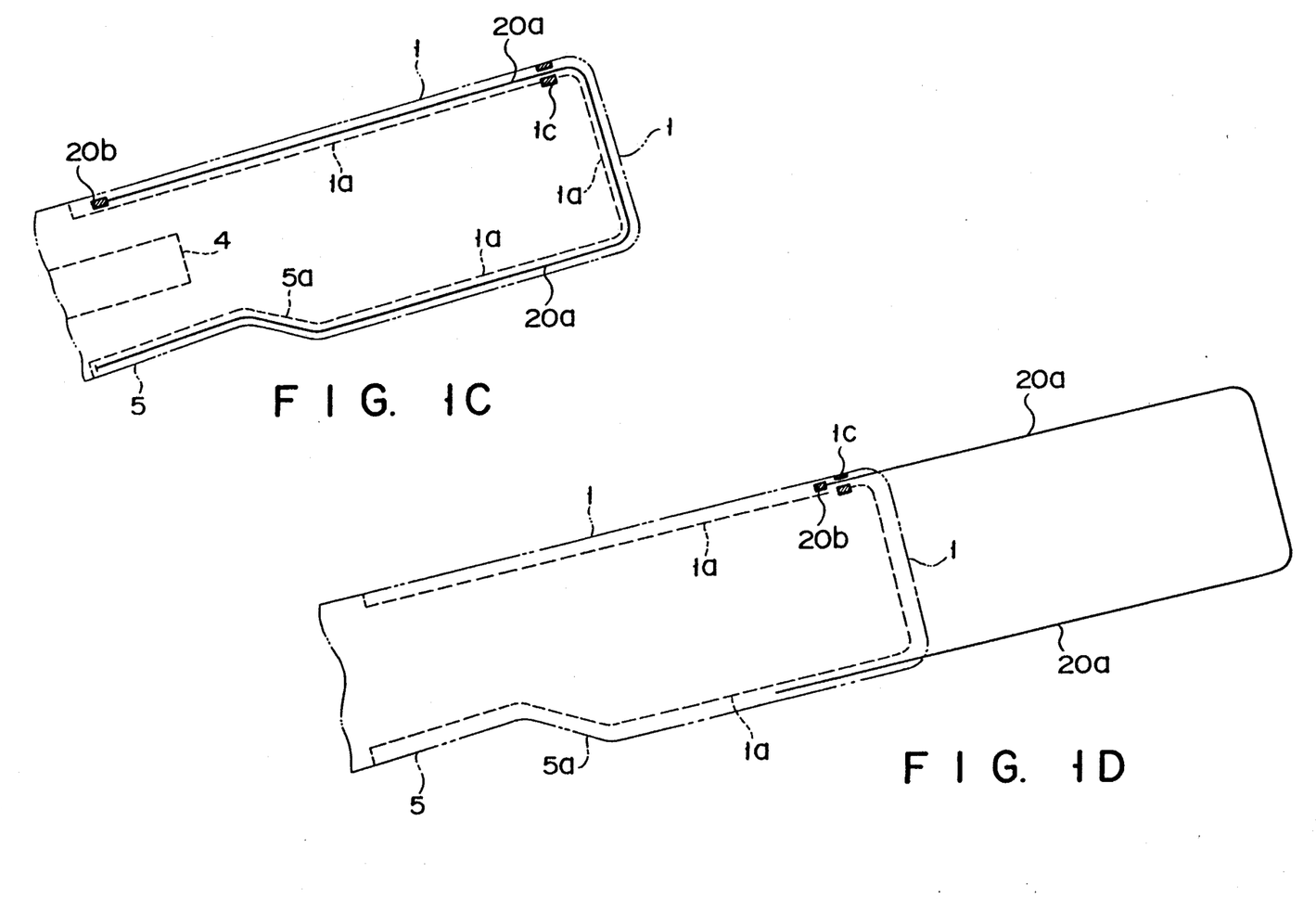
FIGS. 1C and 1D show an antenna placed in a groove formed in a side wall of the casing of the apparatus, and illustrate the operation of the antenna.

An antenna 20a of the transmitter/receiver 20 is plated in an antenna storing groove 1a (FIG. 1A) formed in the side wall of the casing 1, such that the antenna 20a can be drawn out in the longitudinal direction of the casing 1. By virtue of this feature, the antenna 20a does not hinder the data input operation. More specifically, as shown in FIG. 1C, the antenna 20a is formed of an elastic copper wire, and is formed in a shape corresponding to the shape of the groove 1a. When the antenna 20a is stored in the groove 1a, the antenna 20a is, by its own elastic force, pressed on the wall of the groove 1a. Thus, there is no concern that the antenna 20a projects from the groove 1a. Also, since the antenna storing groove 1a is provided with a curved portion 5a at the region of handle portion 5, the antenna 20a is not projected from that side of casing 1, on which the keyboard 3 is arranged, unless an external force is applied.

In order to prevent the antenna 20a from being fallen from the casing 1, one end of the antenna 20a is provided with a large-diameter portion 20b, and a stopper 1c is fixed in the groove 1a at the rear part (keyboard (3) side) of the casing 1.

As shown in FIG. 1D, at the time of data transmission/reception, the antenna 20a is drawn from the rear end of casing 1, on an as-needed basis. Since the large-diameter portion 20b abuts on the stopper 1c, the antenna 20a is prevented from being fallen from the rear end of casing 1.

Figure 3A:
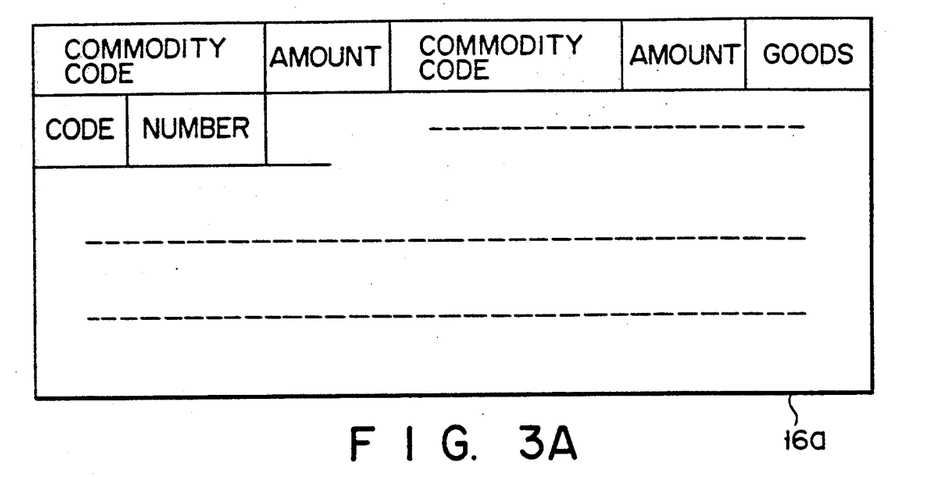
FIGS. 3A to 3F show data units to be stored.
Figure 3B:
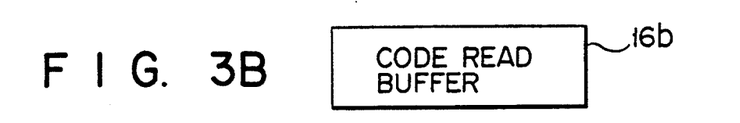
Figure 3C:
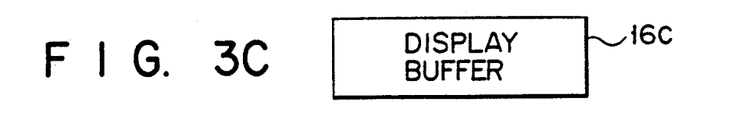
Figure 3D:
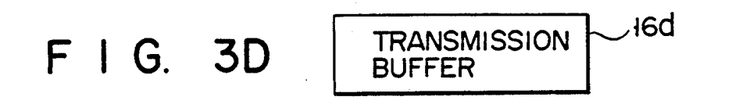
Figure 3E:
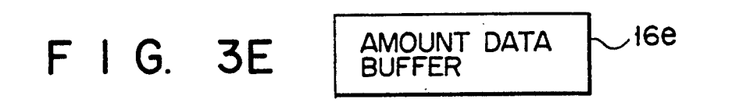
Figure 3F:
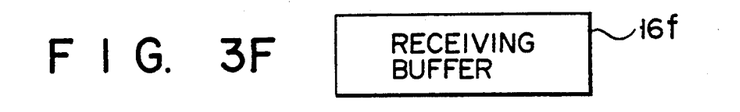

The RAM 16 has a data memory 16a as shown in FIG. 3A. The data memory 16a is able to store commodity codes (bar code data units) read by the bar code reader 2, and order data units representative of the amounts of commodities key-input by the keyboard 3. Further, the RAM 16 includes a code read buffer 16b (FIG. 3B) for temporarily storing bar code data units obtained by the bar code reader 2, a display buffer 16c (FIG. 3C) for storing the data to be displayed in the form of bit pattern data, a transmission buffer 16d (FIG. 3D) for temporarily storing the data to be wirelessly transmitted to the data processing device 19, an amount data buffer 16e (FIG. 3E) for temporarily storing the amount data key-input by the number keys, and a receiving buffer 16f (FIG. 3F) for temporarily storing the data (response signal) received from the data processing device 19.

The display 4 is able to display both amount data (numerical data) and commodity data (bar code data) simultaneously. In lieu of the commodity data, corresponding commodity names may be displayed.

The operation of the portable data input apparatus having the above circuit structure will now be described with reference to a flowchart of FIG. 5.

Figure 5:
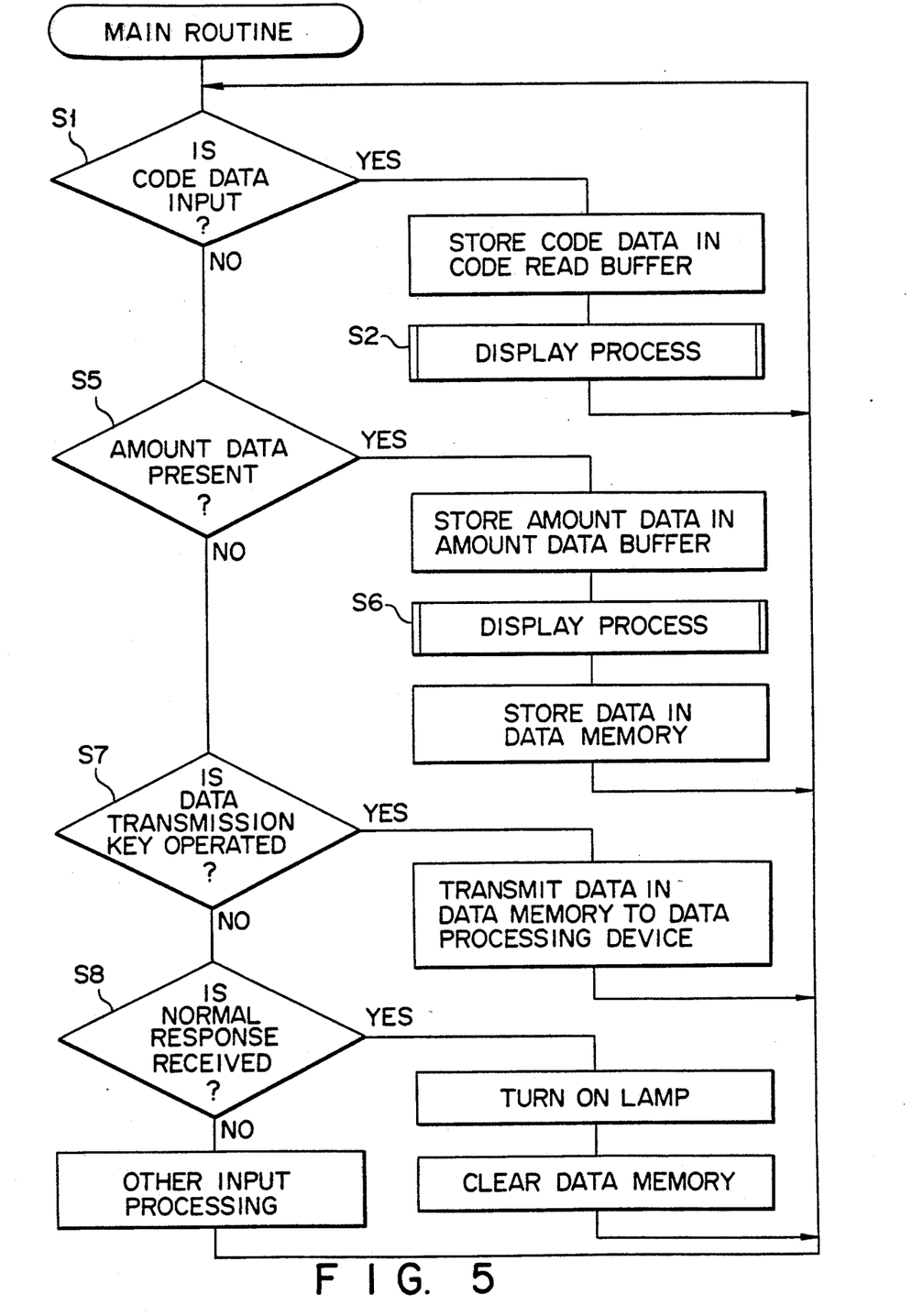
FIGS. 5 and 6 are flowcharts illustrating the operation of the data input apparatus according to an embodiment of the invention.

When the switch 23 of power supply circuit 31 is turned on, the CPU 13 carries out a main routine illustrated in FIG. 5 is carried out in accordance with a control program stored in the ROM.

When bar code data is input from the bar code reader 2 (step S1), the code data is stored in the code read buffer 16b of RAM 16. Then, in step S2, the stored data is subjected to a display process illustrated in FIG. 6.

Figure 4A:
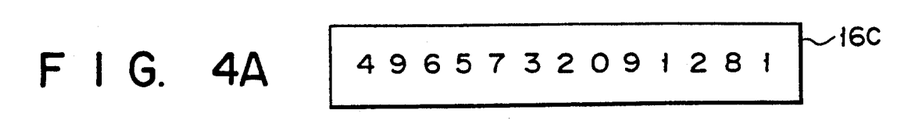
FIGS. 4A and 4B show the display states of data stored in display buffers.
Figure 6:
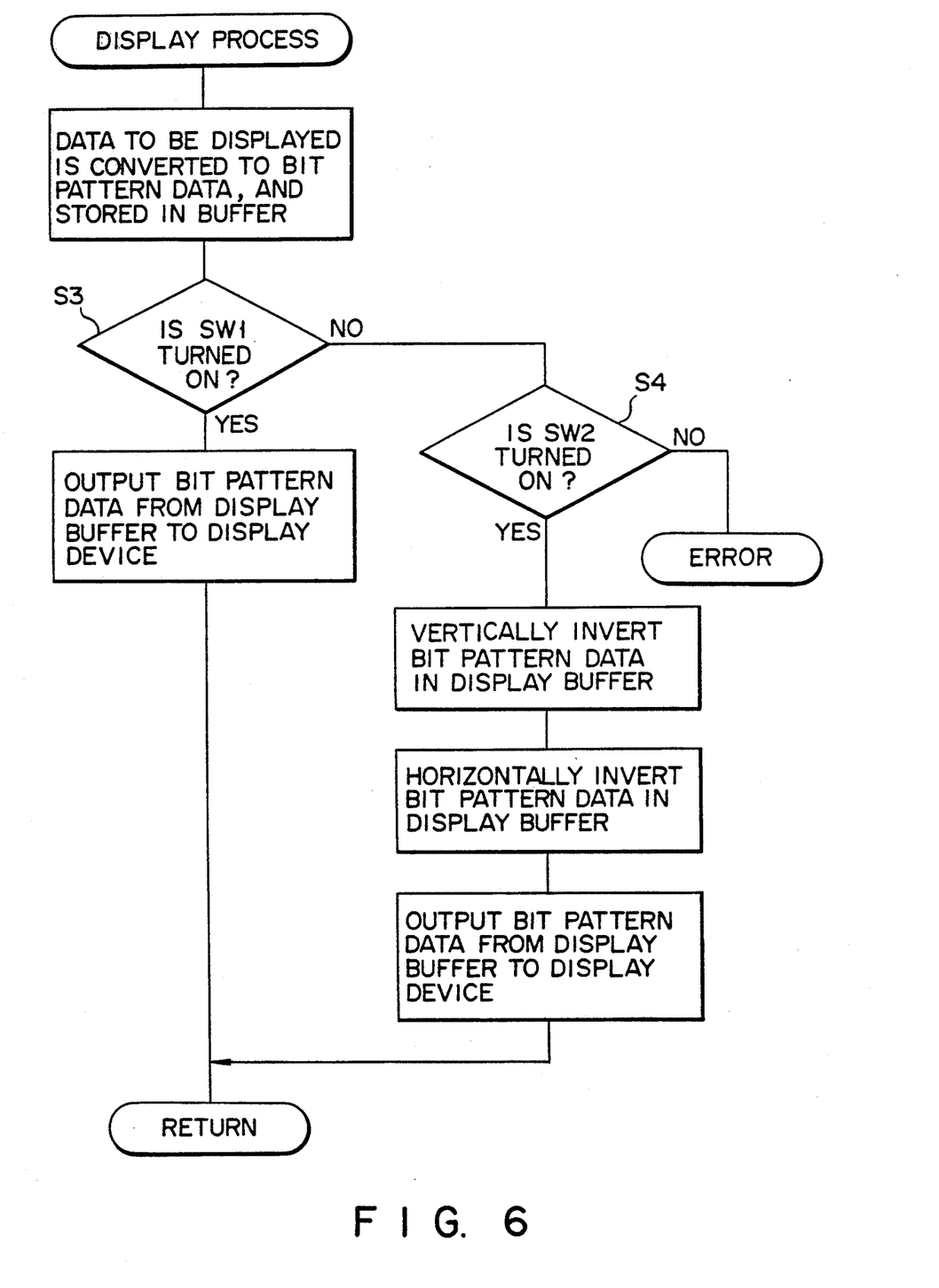
Figure 7A:
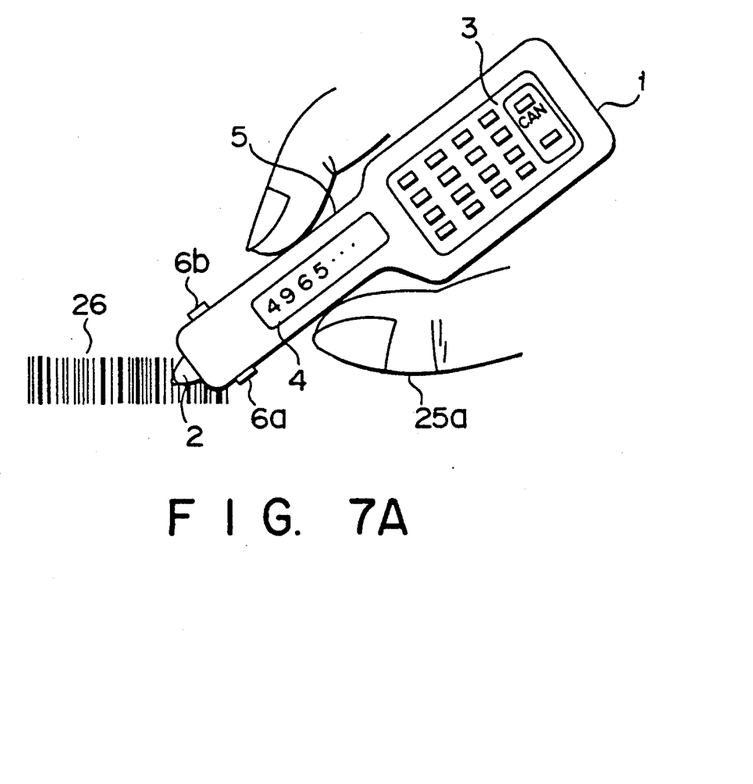
FIGS. 7A and 7B are views for explaining how to operate the data input apparatus according to an embodiment of the invention.

In FIG. 6, when the display process is started, the data to be displayed, which has been stored in the code read buffer 16b or amount data buffer 16e, is converted to bit pattern data by using the aforementioned character generator. Then, the converted data is stored in the display buffer 16c, as shown in FIG. 4A. In step S3, the display mode changing switches 6a and 6b are checked through the input port 17. If the switch 6a is turned on, the bit pattern data stored in display buffer 16c is directly supplied to and displayed by the display 4. Thus, as shown in FIG. 7A, the display 4 shows dot-pattern characters in their erected image, the first character beginning from the side of the bar code reader 2.

Figure 4B:
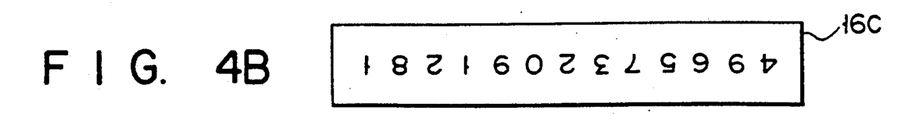

In step S4, when the display switch 6b is turned on, the order of the bit pattern data in each column stored in the display buffer 16c is inverted in the vertical direction, and the order of the bit pattern data in each row is inverted in the horizontal direction. Consequently, the bit pattern data stored in the display buffer 16c is inverted in the vertical and horizontal directions as shown in FIG. 4B, compared to the data shown in FIG. 4A. Thus, the data of inverted dot-pattern characters is supplied to and displayed by the display 4.

After the display process (step S2) shown in FIG. 5 is completed, the routine returns to the start. Then, when numerical data is input by number keys 8 of the keyboard 3 (step S5), the numerical data is once stored in the amount data buffer 16e. Then, the display process for the numerical data is carried out (step S6). Thereafter, the data stored in the code read buffer 16b and amount data buffer 16e is combined as inventory order data representative of a commodity code and the amount of commodities to be ordered, and the combined data is stored in the data memory 16a of RAM 16. After this, the routine returns to the start.

When the data transmission key 12 of keyboard 3 is operated (step S7), all order data stored in data memory 16a is wirelessly sent to the data processing device 19 through the transmission buffer 16d and transmitter/receiver 20.

In step S8, when the transmitter/receiver 20 receives a response signal, which is indicative of the normal reception of wireless output, from the transmitter/receiver built in the data processing device 19, the lamp 7 is turned on for a predetermined period by a lamp drive signal supplied from the lamp drive circuit, and then the data memory 16a is cleared. In this manner, a series of data input and data transmission processes are completed.

How to operate the portable data input apparatus having the above structure will now be described with reference to FIG. 7A and FIG. 7B.

When a right-handed person operates the portable data input apparatus, he grasps the handle portion 5 with the right hand, as shown in FIG. 7A, so that the keyboard 3 and display device 4 face himself. The display mode changing switch 6a provided on the lower side of the casing 1 is operated by the thumb.

The photosensor 2a of bar code reader 2 is brought into contact with a bar code 26 put on a label attached to a display rack. Then, the photosensor 2a is moved in a direction perpendicular to bars of the bar code 26. Thus, the bar code 26 is read, and the commodity code corresponding to the bar code 26 is displayed on the display device 4 in the form of dot-pattern characters in their erected image, the first character being positioned on the side of the bar code reader 2.

Figure 7B:
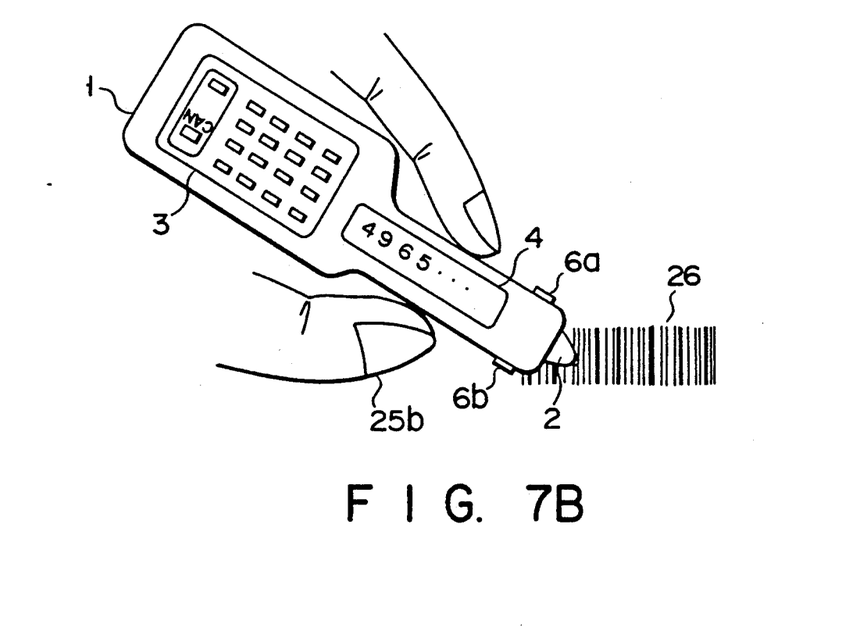

When a left-handed person operates the portable data input apparatus, he grasps the handle portion 5 with the left hand, as shown in FIG. 7B, so that the keyboard 3 and display device 4 face himself. In this case, since the handle portion 5 is grasped with the left hand such that keyboard 3 and display device 4 face the operator, the positions of the keyboard 3 and display mode changing switches 6a and 6b are inevitably inverted, and the lower-side display mode changing switch 6b is turned on by the thumb 25b.

The photosensor 2a of bar code reader 2 is brought into contact with the bar code 26 put on the label attached to the display rack, and the photosensor 2a is moved in a direction perpendicular to the bars of the bar code 26. Thus, the bar code 26 is read, and the commodity code corresponding to the bar code 26 is displayed on the display device 4 in the form of dot-pattern characters in their erected image, the first character being positioned on the side of the keyboard 3.

As has been described above, the bar code reader is integrated with the data input apparatus and by operating the display mode changing switches 6a and 6b, the dot-pattern characters displayed on the display device 4 can be inverted in the vertical and horizontal directions. Thus, either a right-handed person or a left-handed person can always see the read data and key-input in the erected image. Accordingly, the reading of data is easy, and working efficiency is enhanced.

The order data stored in the data memory 16a is instantaneously sent to the data processing device 19 in a wireless manner, by operating the data transmission key 12. In the conventional art, each time a predetermined amount of data units are stored in a memory section of a data input apparatus, it is necessary to move the data input apparatus to the place where a data processing device is installed, and to transfer the data units in the memory section to the data processing device. According to the present invention, this troublesome operation is dispensed with, and the working efficiency of data input can be remarkably enhanced.

The present invention is not limited to the above embodiment. The above embodiment is directed to the case where the present invention is applied to the ordering work for commodities in shops. However, this invention is also applicable to inventory management.

Figures 8, 9:
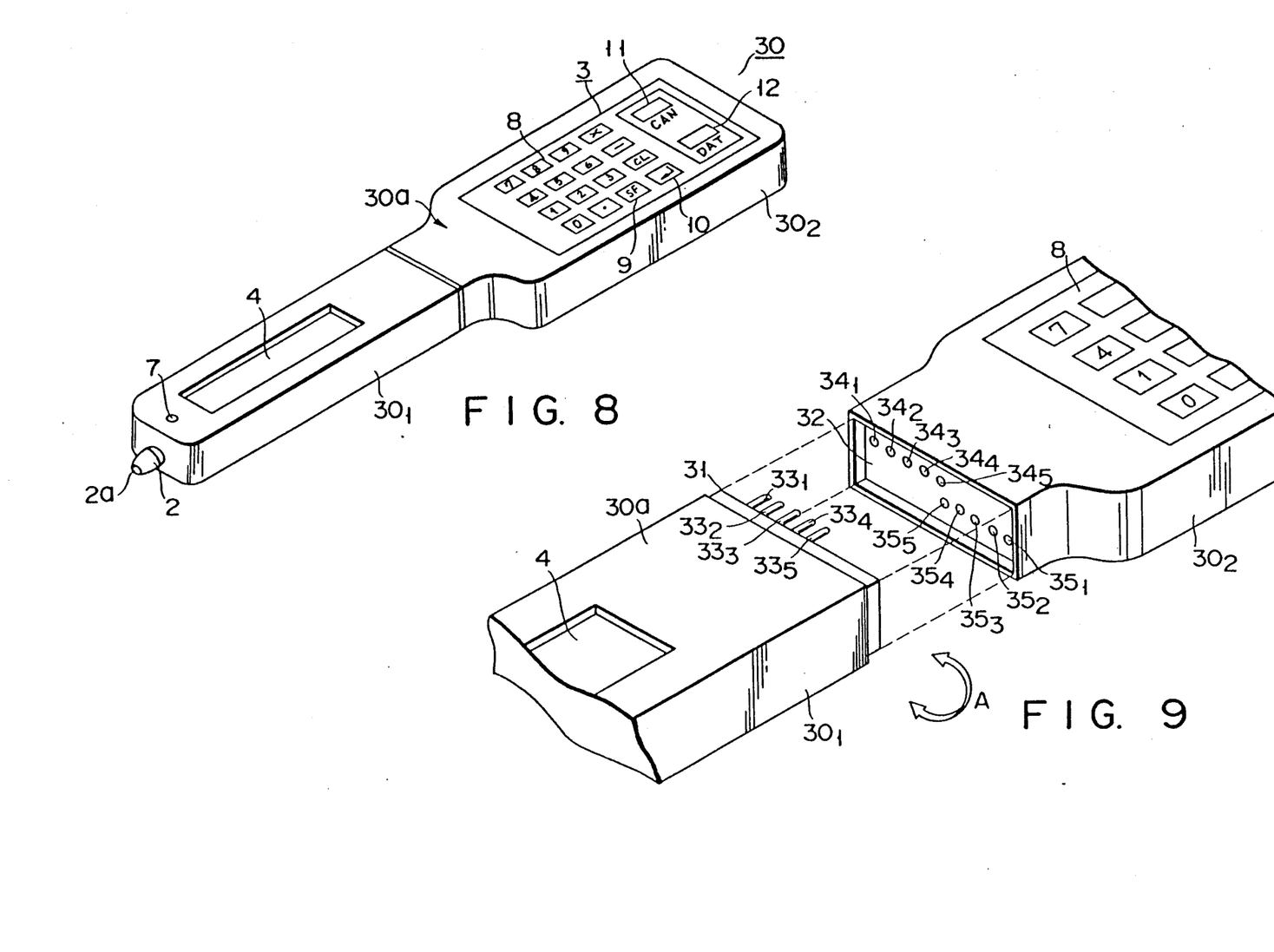
FIG. 8 is a perspective view showing an outer appearance of a modified portable data input apparatus according to the present invention.
FIG. 9 is a view showing an arrangement of a reverse mechanism of the portable data input apparatus in FIG. 8.

FIG. 8 is a perspective view showing an outer appearance of a modified portable data input apparatus according to the present invention. The modified data input apparatus is used for an ordering operation for ordering articles on a showcase in a shop to a wholesale store.

The same components as those shown in FIG. 1A are designated at the same numerals. Referring to FIG. 8, reference numeral 30 denotes an elongated case made of, e.g., a plastic material. The case 30 is constituted by a first case $30_1$ on which a bar code reader 2 and a display 4 are arranged, and a second case portion $30_2$ on which a keyboard 3 is arranged. These components are arranged on one surface, e.g., an upper surface 30a of the case 30. A photosensor 2a, constituted by light-emitting and light-receiving elements, of the pen scanner type bar code reader 2 is attached to the distal end (left side in FIG. 8) of the first case portion $30_1$ along the longitudinal direction. The display 4 arranged on the upper surface 30a is formed into a rectangular shape. The display 4 has a display surface constituted by a liquid crystal and is designed to display input data as dot pattern characters. In addition, a lamp 7 is mounted on the case 30 at a position near the bar code reader 2 so as to inform that a bar code is properly read and data is properly transmitted to a data processing apparatus.

Further, the first case portion $30_1$ is formed to have a substantially rectangular section and to be narrow so as to be in stable contact with a thumb and an index finger of an operator, thereby allowing the operator to easily hold it. It is obvious that the first case portion $30_1$ may have a circular or elliptic section. As described above, the keyboard 3 for key-inputting various data is formed on the upper surface 30a of the case 30 on the second case portion $30_2$ side. In addition to a ten-key pad 8 for inputting numeral data, various function keys are arranged on the keyboard 3: a shift key 9, a scroll key 10 for moving the display position of data displayed on the display 4, a cancel key 11 for canceling data temporarily stored in a data memory of the storage section, and a transmission key 12 for transmitting data stored in the storage section to an external data processing apparatus.

As shown in FIG. 9, the case 30 having the above-described arrangement is designed such that the first case portion $30_1$ is detachably mounted on the second case portion $30_2$.

More specifically, a projection 31 is formed on a surface of the first case portion $30_1$ which opposes the second case portion $30_2$. A recess 32 is formed in a surface of the second case portion $30_2$ which opposes the first case portion $30_1$ so as to be engaged with the projection 31. For example, five plugs $33_1$ to $33_5$ are formed on the projection 31 of the first case portion $30_1$. Of these plugs, the plugs $33_1$ to $33_4$ serve to perform signal communication between a group constituted by the display 4, the bar code reader 2, and the lamp 7 and a microcomputer housed in the second case portion $30_2$. The plug $33_5$ is an attachment state detecting plug for detecting whether the first case portion $30_1$ is attached to the second case portion $30_2$ in a normal state or a reverse state. Note that the attachment state detecting plug $33_5$ is grounded in the first case portion $30_1$. Sockets $34_1$ to $34_5$ in which the plugs $33_1$ to $33_5$ are respectively inserted are attached to the second case portion $30_2$.

In addition, sockets $35_1$ to $35_5$ (to be described below) are formed in the recess 32 of the second case portion $30_2$ at diagonal positions with respect to the sockets $34_1$ or $34_5$ with the center of the recess 32 being regarded as an axis. The sockets $35_1 35_2$, $35_3$, $35_4$, and $35_5$ are formed in the recess 32 in such a manner that when the first case portion $30_1$ is rotated in a direction indicated by an arrow A in FIG. 9, signals from the plugs $33_1$ to $33_5$ are respectively transferred to the sockets $35_1$ to $35_5$. The respective combination of sockets, i.e., the sockets $34_1$ and $35_1$, the sockets $34_2$ and $35_2$, ..., for signal reception on the second case portion $30_2$ side are connected to each other. With this arrangement, either in a basic mode in which the first case portion $30_1$ is attached for a right-handed operator or in a reverse mode in which it is reversed through 180° and attached for a left-handed operator, each signal can be properly received. The microcomputer can detect an attachment state of the first case portion $30_1$ with respect to the second case portion $30_2$ on the basis of an insertion state of the plug $33_5$ with respect to the socket $35_5$.

FIG. 2 is a block diagram showing a schematic arrangement of the portable data input apparatus. Referring to FIG. 2, reference numeral 13 denotes a CPU for executing various operations. The input port 17 receives an attachment state signal from the socket $33_5$, which represents an attachment state of the first case portion $30_1$.

Figure 10:
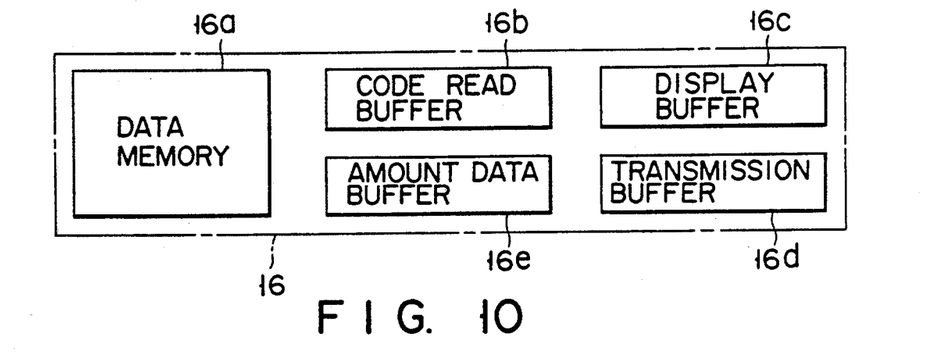
FIG. 10 is a view showing another storage contents of a RAM in FIG. 2.

As shown in FIG. 10, the RAM incorporates the data memory 16a capable of storing a plurality of ordering data comprising article codes (code data), which are read by the bar code reader 2 and are converted into bar codes, and quantities (numeral data) which are key-input through the keyboard 3. In addition, the RAM 16 incorporates the code read buffer 16b for temporarily storing the code data (article code) of a bar code read by the bar code reader 2, the display buffer 16c for storing data to be displayed on the display 4 in a state developed into bit pattern data, the transmission buffer 16d for radio-temporarily storing transmission data to be transmitted to the data processing apparatus 19, and the like, the amount data buffer 16e for temporarily storing numeral data (quantity) which is key-input through the ten-key pad 8.

An operation of the portable data input apparatus having the above-described arrangement will be described below.

Assume that code data is input from the bar code reader 2 in a state wherein the first case portion $30_1$ is attached to the second case portion $30_2$ either in the basic mode in which the case 30 is held with the right hand or in the reverse mode in which the first case portion $30_1$ is reversed through 180° and the case 30 is held with the left hand. Subsequently, the CPU 13 executes display processing for the input code data in accordance with a flow chart shown in FIG. 11.

Figure 11:
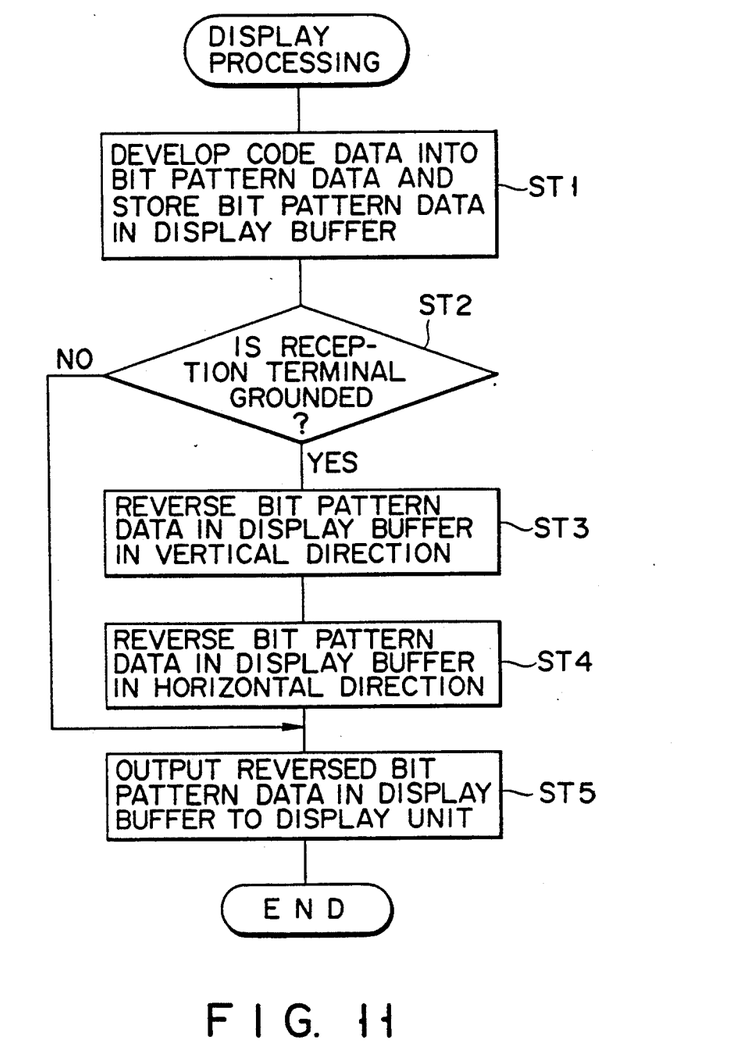
FIG. 11 is a flow chart for explaining display processing of the modified portable data input apparatus according to the present invention.
Figure 12A:
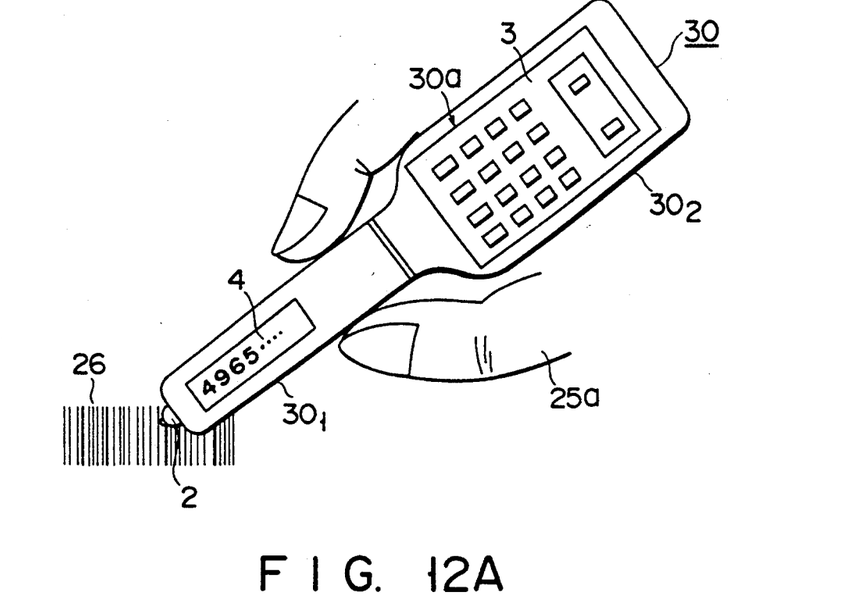
FIGS. 12A and 12B are views for explaining how to operate the modified portable data input apparatus according to the present invention.

When the processing is started in accordance with the flow chart, the code data to be displayed which is read by the bar code reader 2 and stored in the code read buffer 16b is developed into bit pattern data by using the character generator, and is stored in the display buffer 16c in step ST1, as shown in FIG. 4A. In step ST2, a state of the socket $35_5$ in the recess 32 of the second case portion $30_2$ is checked through the input port 17. In this case, if the socket $35_5$ is not grounded, it indicates that the plug $33_5$ is not inserted in the socket $35_5$. Therefore, it is determined that the first case portion $30_1$ is attached to the second case portion $30_2$ in the basic mode without being reversed, as shown in FIG. 12A.

In step ST5 (to be described later), the bit pattern data stored in the display buffer 16c is directly supplied to the display 4 and is displayed thereon. As a result, the code data which is converted into dot pattern characters is displayed as an erect image with the start character being located on the bar code reader 2 side, as shown in FIG. 12A.

Figure 12B:
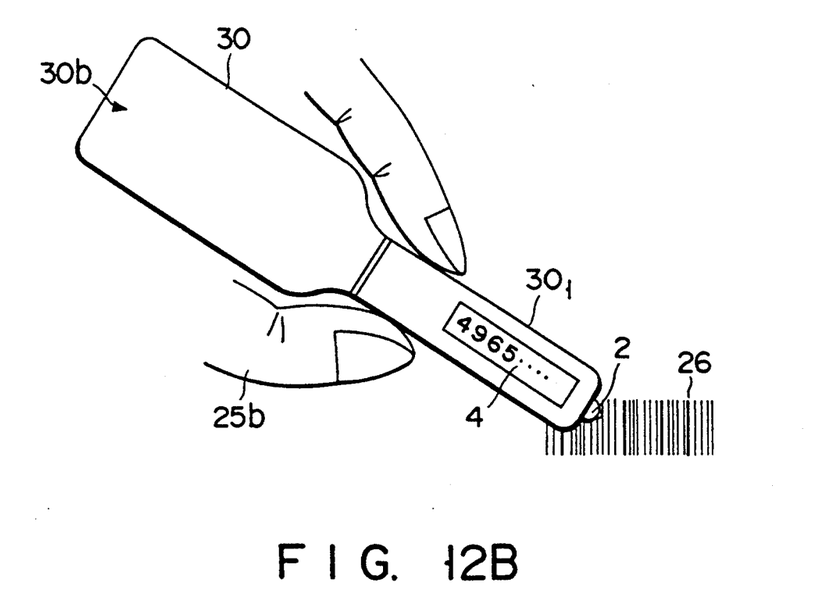

If it is determined in step ST2 that the socket $35_5$ is grounded, it indicates that the plug $33_5$ is inserted in the socket $35_5$. Therefore, it is determined that the first case portion $30_1$ is reversed through 180° and attached to the second case portion $30_2$, as shown in FIG. 12B. That is, the display 4 is located on the rear surface $30b$ side of the case 30.

It is obvious that display units identical to the display 4 may be arranged on the front and rear surfaces of the second case portion $30_2$.

In step ST3, the bit data of each column of the bit pattern data currently stored in the display buffer 16c is reversed in the vertical direction. In step ST4, the bit data of each row is reversed in the horizontal direction. As a result, as shown in FIG. 12B, the bit pattern data in the display buffer 16c is reversed in the vertical and horizontal directions with respect to the data shown in FIG. 12A. In step ST5, the bit pattern data stored in the display buffer 16c is supplied to the display 4 and is displayed thereon. With this operation, as shown in FIG. 12B, the code data which is converted into dot pattern characters is displayed as an erect image with the start character being located on the second case portion $30_2$ side.

If identical display 4 are respectively arranged on the front and rear surfaces of the second case portion $30_2$, the display 4 are designed such that a dot pattern displayed on one display unit is reversed with respect to that displayed on the other display. In this case, the two display may simultaneously display the same data.

When quantity data is input through the ten-key pad 8 of the keyboard 3 after the bar code representing the article code is read in this manner, ordering data consisting of article codes and quantities are sequentially stored in the data memory 16a. When the data transmission key 12 is depressed in a state wherein a predetermined amount of ordering data is stored in the data memory 16, all the order data stored in the data memory 16 is radio-transmitted to the data processing apparatus 19 through the transceiver 20. Upon reception of the data, a normal response signal is transmitted from the transceiver incorporated in the data processing apparatus 19 to the CPU 13 through the transceiver 20, and the lamp 7 is turned on for the predetermined period of time.

An operation of the portable data input apparatus having the above-described arrangement will be described below with reference to FIGS. 12A and 12B.

When a right-handed operator is to operate this portable data input apparatus, the first case portion $30_1$ on which the display 4 is arranged is attached to the second case portion $30_2$ on which the keyboard 3 is arranged in the basic mode in which both the keyboard 3 and the display 4 face the front side, as shown in FIG. 12A.

Subsequently, the first case portion $30_1$ is held with a right hand 25a in such a manner that the display 4 and the keyboard 3 face the front side.

The photosensor 2a of the bar code reader 2 is then brought into contact with a bar code 26 of a label bonded to a showcase and is moved in a direction perpendicular to each bar. As a result, the bar code 26 is read, and an article code corresponding to the bar code 26 is displayed on the display 4 as the erect image of dot pattern character data with the start character being located on the bar code reader 2 side.

When a left-handed operator is to operate the portable data input apparatus, the first case portion $30_1$ on which the display 4 is arranged is reversed through 180° and attached to the second case portion $30_2$ on which the keyboard 3 is arranged, as shown in FIG. 12B.

Subsequently, the first case portion $30_1$ is held with a left hand 25b in such a manner that the keyboard 3 and the display 4 face the opposite sides.

The photosensor 2a of the bar code reader 2 is then brought into contact with a bar code 26 of a label bonded to a showcase and is moved in a direction perpendicular to each bar. As a result, the bar code 26 is read and is displayed on the display 4 as the erect image of dot pattern character data with the start character being located on the second case portion $30_2$ side.

Since the first case portion $30_1$ on which the display 4 is arranged can be reversed through 180° and attached to the second case portion $30_2$ on which the keyboard 3 is arranged in this manner, both the right-and left-handed operators can always see read code data as an erect image. Therefore, a read error can be prevented, and the operability can be greatly improved.

Although the first case portion $30_1$ is designed to be detachably mounted on the second case portion $30_2$, for example, a shaft is arranged at the center of the case 30 so as to pivotally arrange the first case portion $30_1$ around the shaft. With this arrangement, the first case portion $30_1$ can be reversed through 180° with respect to the second case portion $30_2$ in effect.

Furthermore, the modified data input apparatus according to the present invention is used for an ordering operation for each article in a shop. However, the present invention can be applied to inventory management of each article other than an ordering operation.

As has been described above, the present invention can provide a portable data input apparatus, in which the bar code reader is integrated with the case, and one case portion to which the bar code reader and the display portion are attached has an end face which is formed to be point symmetrical about the rotational center and to be rotated reversibly through 180° with respect to an end face of the other case portion, and a display state of the display unit can be reversed vertically and horizontally, thereby improving readability of bar codes, allowing right- and left-handed operators to see the erect image of displayed data, preventing a read error, and greatly improving operability of the overall apparatus.

What is claimed is:

1. A portable data input apparatus comprising:
a pen-scanner type bar code reader for reading a bar code provided according to the king of a commodity and for generating a corresponding code data;
a keyboard for inputting at least numerical data representative of the amount of the commodity;
a display device for displaying the code data generated by said bar code reader and the numerical data input through said keyboard;
means for detecting whether the code data and numerical data are inversely or erectly displayed, and for generating a corresponding detection signal; and
display mode inverting means for vertically and horizontally inverting display states of the code data and numerical data displayed by said display device, in response to the detection signal generated by said detecting means.

2. The apparatus according to claim 1, wherein said bar code reader includes a photosensor for detecting light reflected from the bar code.

3. The apparatus according to claim 1, wherein said display mode inverting means is a central processing unit (CPU).

4. The apparatus according to claim 1, further comprising display means for confirming that the bar code has been correctly read by the bar code reader.

5. A portable data input apparatus comprising:
a pen-scanner type bar code reader for reading a bar code;
a display for displaying code data corresponding to the bar code read by said bar code reader;
a keyboard for key-inputting various data, said bar code reader, said display unit, and said keyboard being sequentially arranged along a longitudinal direction of an outer surface of an elongated case;
a reverse mechanism for mechanically reversing a first case portion including said display through 180° with respect to a second case portion including said keyboard;
reverse detecting means for detecting a state of said first case portion reversed by said reverse mechanism and for detecting whether said display is inverted; and
display state reverse means for reversing a display state of data displayed on said display in vertical and horizontal directions in response to detection of reversing by said reverse detecting means, and displaying the reversed data.

6. An apparatus according to claim 5, wherein said reverse mechanism includes a means for mounting said first case portion detachably on said second case portion so as to reverse said first case portion mechanically through 180° with respect to said second case portion.

7. A portable data input apparatus comprising:
a pen-scanner type bar code reader for reading a bar code;
a display for displaying code data corresponding to the bar code read by said bar code reader;
a keyboard for key-inputting various data, said bar code reader, said display unit, and said keyboard being sequentially arranged along a longitudinal direction of an outer surface of an elongated case;
a reverse mechanism for mechanically reversing a first case portion including said display through 180° with respect to a second case portion including said keyboard;

reverse detecting means for detecting a state of said first case portion reversed by said reverse mechanism by detecting whether a terminal to be detected which is formed on said first case portion in advance is electrically grounded; and display state reverse means for reversing a display state of data displayed on said display in vertical and horizontal directions in response to detection of reversing by said reverse detecting means, and displaying the reversed data.

8. An apparatus according to claim 7, further comprising first and second detection terminals which correspond to said terminal to be detected, and which are respectively formed at positions to be point symmetrical with each other about the central axis perpendicular to the surface of said first case portion which opposes said second case portion, a reverse state of said first case portion being detected by detecting whether said terminal to be detected is connected to said first or second detection terminal.

9. A portable data input apparatus comprising:

an elongated casing:

a pen-scanner type bar code reader, attached at one end of the casing in its longitudinal direction, for reading a bar code provided according to the king of a commodity and generating a corresponding code data unit;

a keyboard, attached on the other side of the casing it its longitudinal direction, for inputting at least numerical data units representative of the amount of the commodity;

a transmitter/receiver for wirelessly outputting the code data unit read by the bar code reader and the numerical data units key-input from the keyboard, and receiving a response signal representative of the fact that the wirelessly transmitted data units have been received;

a display device attached to the surface of the casing for displaying the code data units and the numerical data units;

a display mode selecting switch generating a signal indicative of whether the said pen scanner is being held in the right or left hand of the scanner operator; and display mode inverting means for vertically and horizontally inverting display states on the data units displayed on the display device, in response to said signal generated by the display mode selecting switch.

10. The apparatus according to claim 9, wherein said bar code reader includes a photosensor for detecting light reflected from the bar code reader.

11. The apparatus according to claim 9, wherein said display mode inverting means is a central processing unit (CPU).

12. The apparatus according to claim 9, further comprising display means for confirming that the bar code has been correctly read by the bar code reader, and that the code data unit and numerical data unit have been correctly transmitted.

13. The apparatus according to claim 9, wherein said display mode selecting switch comprises two switches.

14. The apparatus according to claim 9, further comprising a handle portion formed on one side of the casing in its longitudinal direction.

* * * * *